May 6, 1952 D. LANGFELD ET AL 2,595,471
TEST AND REPAIR BENCH FOR HEAT EXCHANGERS
Filed July 10, 1946 4 Sheets-Sheet 1
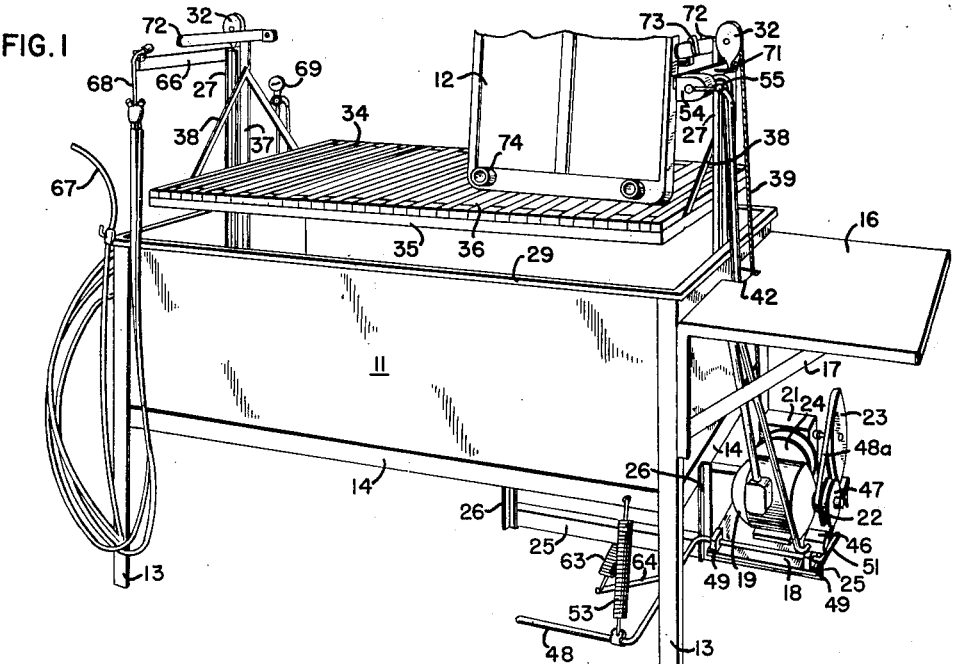
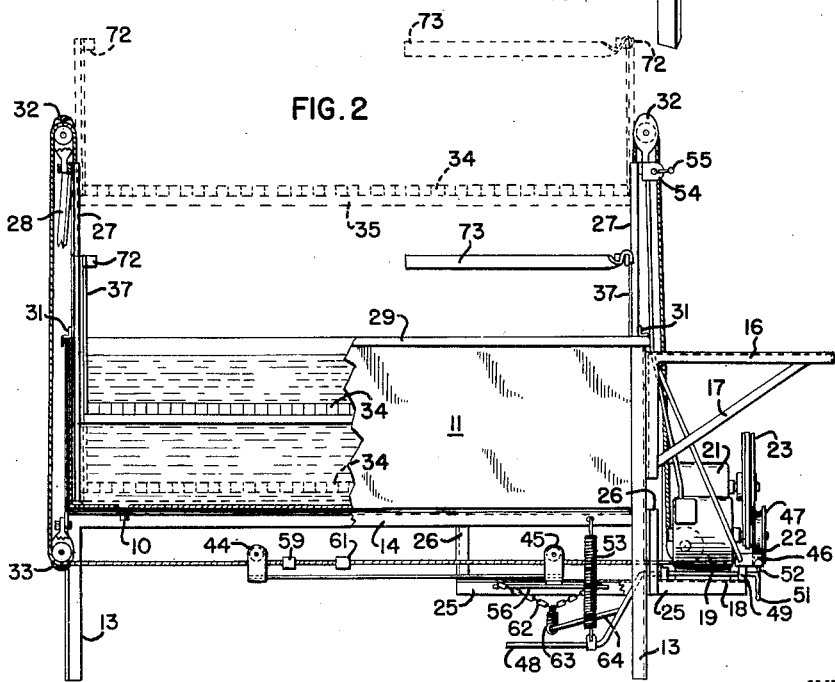
INVENTOR.
DANIEL LANGFELD
ROBERT LECKEY
BY RAYMOND A. OLSON
EARL GRANT WEBB
ATTORNEY May 6, 1952

D. LANGFELD ET AL 2,595,471

TEST AND REPAIR BENCH FOR HEAT EXCHANGERS

Filed July 10, 1946

INVENTOR.
DANIEL LANGFELD
ROBERT LECKEY
BY RAYMOND A. OLSON
EARL GRANT WEBB

Baird Freeman
ATTORNEYS

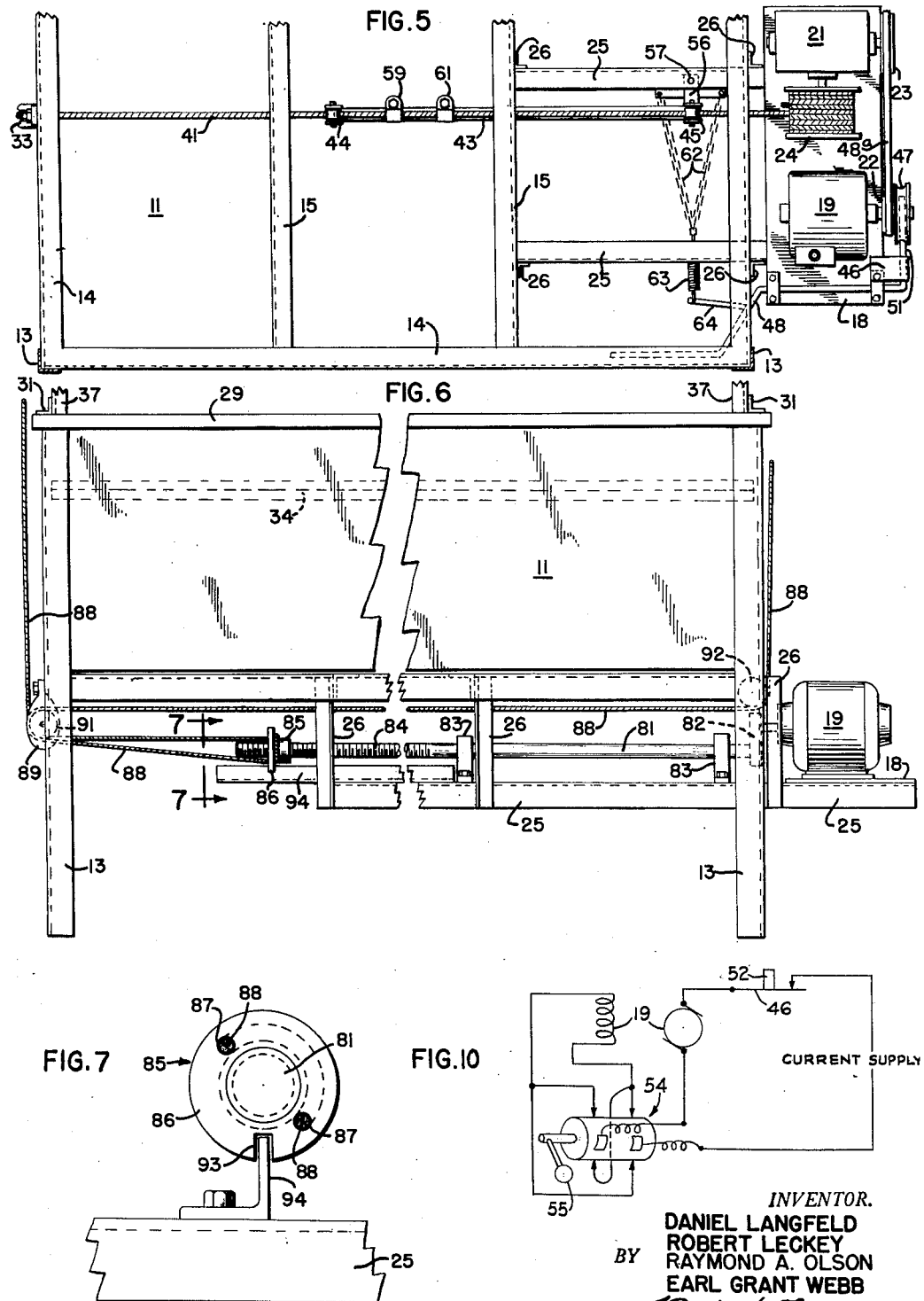

May 6, 1952 D. LANGFELD ET AL 2,595,471
TEST AND REPAIR BENCH FOR HEAT EXCHANGERS
Filed July 10, 1946 4 Sheets-Sheet 4

INVENTOR.
DANIEL LANGFELD
BY ROBERT LECKEY
RAYMOND A. OLSON
EARL GRANT WEBB
Bair & Freeman
ATTORNEYS Patented May 6, 1952

2,595,471

UNITED STATES PATENT OFFICE 2,595,471

TEST AND REPAIR BENCH FOR HEAT EXCHANGERS

Daniel Langfeld, Robert Leckey, and Raymond A. Olson, Omaha, and Earl Grant Webb, Bellevue, Nebr., assignors, by mesne assignments, to Inland Manufacturing Company, Omaha, Nebr., a corporation of Nebraska Application July 10, 1946, Serial No. 682,624

5 Claims. (Cl. 187—17)

This invention relates to test and repair benches for heat exchangers and is particularly applicable to test and repair benches for the radiators associated with the cooling system of internal combustion engines.

While the description and drawings are mainly directed to automobile radiator test and repair, it is obvious that the apparatus may be used for any heat exchange apparatus of this general type, such as, for example, condenser or evaporator coils for refrigeration and air conditioning apparatus, airplane engine cooling radiators, diesel engine radiators, and many others.

Heretofore, radiator test and repair benches have been used wherein a platform on which the radiator is placed is lowered into a tank of water by mechanical or hydraulic means, for the purpose of locating leaks by the use of compressed air, and the platform then raised so that a torch may be applied to the leak for sealing the same. However, the test benches heretofore used have been cumbersome and unsightly and have not placed the radiator in such a position that it is easy to work upon. Furthermore, the raising and lowering of the platform has not been accomplished electrically with proper controls for positioning and limiting the movement of the platform.

It is, therefore, an object of the invention to provide an improved test and repair bench for heat exchange apparatus which is compact and pleasing in appearance.

It is also an object of the invention to provide a test and repair bench which properly positions the heat exchange apparatus for test, and for easy access for repair.

It is another object of the invention to provide a test and repair bench for heat exchange apparatus which includes an electrically operated elevator and also to provide electrical controls for the elevator which permit positioning the elevator wherever desired, and which automatically limit the up and down movement of the elevator.

It is a further object of the invention to provide improved devices for retaining the heat exchange apparatus on the elevator or platform in the desired positions for test and repair.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Figure 1 is a perspective view of an assembled radiator test bench with a radiator thereon partially broken away, illustrating one embodiment of the invention;

Figure 2 is a front elevation of the radiator test bench shown in Figure 1, the dotted lines illustrating different positions of the radiator supporting platform;

Figure 5 is a top view of the drive and stop mechanism for the bench shown in Figure 1;

Figure 6 is a side view of another mechanism for raising and lowering the platform;

Figure 7 is a view taken on line 7—7 of Figure 6;

Figure 10 is a wiring diagram of the motor circuit and control switches.

Description of Figures 1 to 5

Figure 3:
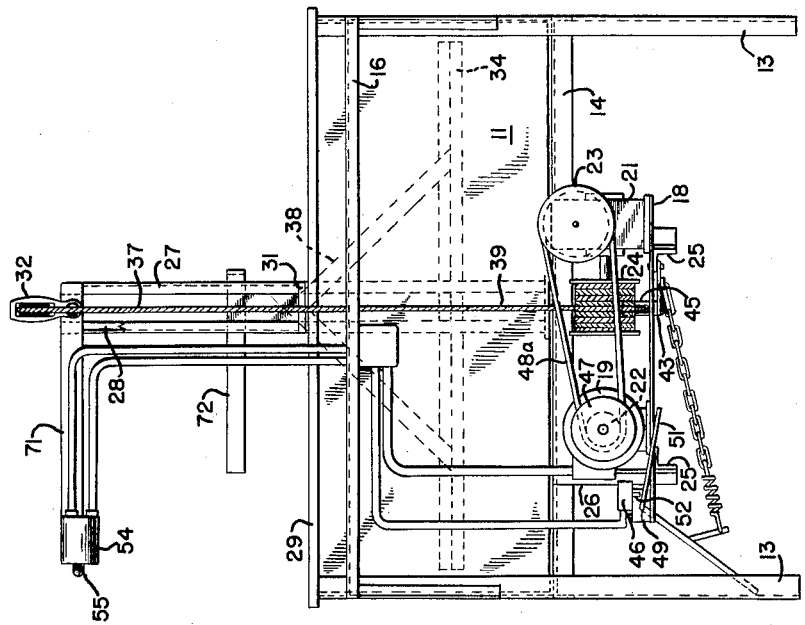
Figure 3 is a side elevation of one side of the test bench.
Figure 4:
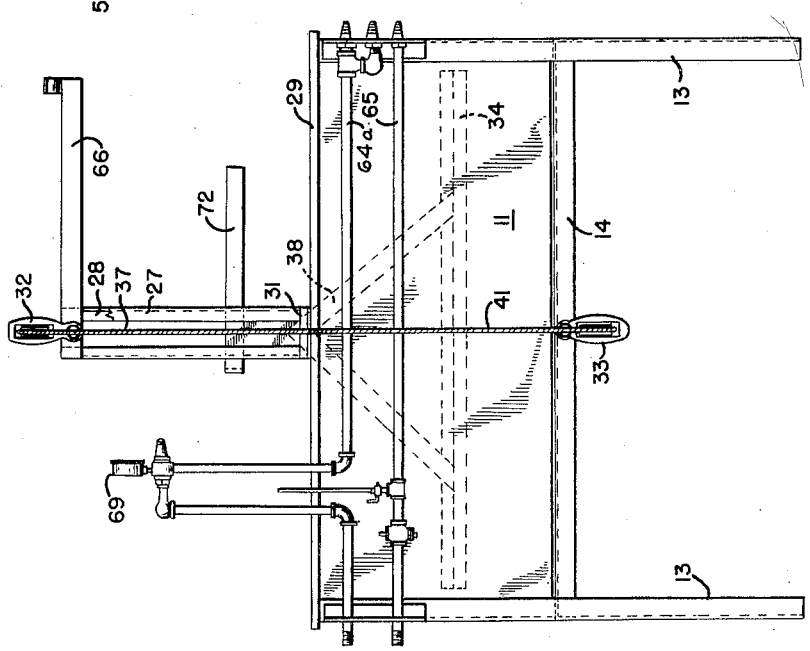
Figure 4 is a side elevation of the other side of the test bench.

Referring specifically to the drawings, and particularly to Figures 1 to 5, for a detailed description of the first embodiment of the invention, numeral 11 designates generally a tank of sufficient size preferably to contain an ordinary automobile radiator 12. The tank 11 is ordinarily partially filled with water, and a drain plug 10 is provided in the bottom thereof for draining and cleaning the tank when desired. The tank 11 is supported on angle iron corner legs 13, to which are welded horizontal angle members 14 on which the bottom of tank 11 rests. Cross supporting members 15 are also provided to support the bottom of the tank 11 and to generally strengthen and reinforce the structure.

A platform 16 is provided at one end of the tank 11 and is supported by brackets 17 attached to the angle iron legs 13 adjacent the top thereof.

A platform 18 for supporting a motor 19, gear box 21, pulleys 22 and 23 and a cable drum 24 is supported on horizontal angle iron members 25, which are, in turn, suspended from one of the cross members 15 and one of angle members 14 by four vertical straps 26.

A pair of upright trackways 27 are secured interiorly of the tank 11 at opposite ends thereof and braces 28 formed integrally with the respective trackways 27 extend on the outside of the tank 11 and are secured to opposite angle members 14. The trackways 27 are also secured to a top flange 29 on the tank 11, by angle pieces 31.

Pulleys 32 are secured to the upper ends of trackways 27 and one lower pulley 33 is vertically aligned with pulleys 32 and is secured to an angle member 14 opposite the motor supporting platform 18.

A movable platform generally indicated at 34 is disposed horizontally within tank 11 and is substantially coextensive with the outline of the tank. The platform 34 is formed by a rectangular metal frame 35, to which a number of spaced apart wooden slats 36 are secured. Vertical slide members 37 are secured to and extend upwardly from the frame 35 of the platform, and the slide members are received in the upright trackways 27 which guide and afford vertical movement of the slide members 37 and platform 34. Triangularly disposed braces 38 are secured to the slide members 37 and to frame 35.

Two cables 39 and 41 are secured to and wind around the cable drum 24. One cable 39 extends from the cable drum 24 upwardly through a slot 42 in platform 16 to the corresponding upper pulley 32, then over the pulley and is fastened to the outer side of slide member 37. The other cable 41 extends from the drum 24 over a cable guide generally indicated at 43, which includes a pair of guide pulleys 44 and 45, thence over lower pulley 33, corresponding upper pulley 32, and is secured to the outer side of corresponding slide member 37.

Operation of Figures 1 to 5

The motor 19 is provided with an automatic cut-off switch 46 and is also provided with a brake pulley 47 adjacent the driving pulley 22. A belt 48a extends between driving pulley 22 and driven pulley 23.

A motor switch operating foot lever 48 formed generally in the shape of an S is pivotally mounted on motor platform 18, as shown at 49, and includes an extension 51 which is movable up and down to contact a switch finger 52 in switch 46, which, in turn, opens and closes the contacts (not shown) in the switch. The extension 51 also is movable to engage with the brake pulley 47 to quickly stop the motor 19 at the proper time. The foot lever 48 is held in the raised position normally by spring 53 and the switch 46 is normally closed.

A standard reversing switch 54 having an "off" position and a lever 55 for operation is connected to the motor 19 to control its rotation in either direction.

An automatic cut-off device is provided to limit movement of the platform 34, both up and down, and comprises a T-shaped member 56 pivoted at 57 to one of the angle supporting members 25, and the cable guide 43 is secured to the bottom of the T and adjacent pulley 45. The cable 41 is provided with adjustable stops 59 and 61 between the pulleys 44 and 45. Converging chains 62 are secured to the crossarm of the T-shaped member 56 and to one end of a coil spring 63. A rod 64 connects the other end of the coil spring and an intermediate portion of foot lever 48 in such an angular position that horizontal movement of the T-shaped member 56 tends to lower the foot lever 48 against the force of spring 53 to open the switch 46 and apply the motor brake.

Suitable lines 64a and 65 are provided for compressed air and acetylene or other gas used in testing and repairing radiators. A bracket 66 secured to one of the trackways 27 serves to support an air hose 67 and a torch 68 when not in use. A compressed air gauge and reducer 69 is also provided. The motor switch 54 is mounted on a similar bracket 71 secured to the other trackway 27.

The slides 37 are provided with brackets 72 adjacent their upper ends, against which a radiator may be placed in an upright position. A removable bracket member 73, adapted to slide over one of the brackets 72 and preferably extend at right angles thereto, is also provided and serves to support the radiator in an upright position while work is done thereon.

Assuming that platform 34 is in approximately the position shown in Figure 1 with the platform 34 disposed above the level of the water, the radiator 12 to be tested and, if necessary, repaired, is placed on the platform 34 and all connections thereto are plugged by corks 74, except the overflow conduit (not shown). The compressed air hose 67 is attached to the overflow connection and compressed air applied to the radiator. It is then necessary to lower the platform 34 below the water level, as shown in Figure 2, and the lowering is accomplished in the following manner.

The lever 55 of switch 54 is thrown from "off" to the "down" position, thus energizing motor 19 and driving cable drum 24 in the proper direction for paying out cables 39 and 41. As the cables pay out, the weight of the platform and radiator will cause the platform to descend, and slide members 37 in trackways 27 guide such downward movement. When the radiator is completely submerged, the operator may either again throw the main switch lever 55 to "off" or may depress foot pedal 48 by foot pressure. If the latter operation is preferred, the projection 51 strikes switch finger 52 to open switch 46 and de-energize motor 19 and projection 51 also engages with brake pulley 47 to quickly stop rotation of the motor 19 and cable drum 24. Very close adjustment of radiator and platform position may be effected by operating the foot lever control. Obviously, the platform may be positioned at any location desired within the limits of the guideways, either under the water for test, or above the level of the water for repair, depending on which part of the radiator is showing a leak.

The compressed air in the radiator will leak from any holes therein and form air bubbles in the water in tank 11, which show the location of any leak. It is then necessary to raise the platform 34 and the radiator 12 out of the water and, if leaks are present, to repair them by using the torch 68.

In order to raise the platform 34, and assuming, of course, that switch 46 is closed, the operator throws the main switch lever 55 to the "up" position, thereby reversing the rotation of motor 19 and causing cable drum 24 to wind cables 39 and 41 thereon, thus raising platform 34 to the position, for example, shown in Figure 1. The gearing is preferably of the worm gear type and locks the platform in any position at which it is stopped. The radiator 12, which has been laid flat on the platform for testing, may now be disposed in a substantially vertical position for repair, resting against one of the brackets 72 or bracket 73, which may be removably attached to either bracket 72.

If the platform 34 is lowered to the position shown in the lower dotted lines in Figure 2, the motor 19 is automatically de-energized because stop 59 moves to the left, as viewed in Figure 5, and abuts against pulley 44. Pulley 44 and cable guide 43, and pulley 45 are, therefore, moved to the left, thus moving the T-shaped member 56 about its pivot 57 and pulling chain 62 against spring 63. When sufficient pull is exerted by the spring 63, the foot lever 48 is pulled downwardly and extension 51 opens the switch 46 to de-energize the motor 19 and brakes against brake pulley 47. The downward movement of platform 34 is thus automatically stopped and damage to the cables or other moving parts is prevented. In order to start the platform on its upward travel again, it is necessary to throw main switch lever 55 to the "up" position and to lift the lever 48 with the toe to close switch 46 and release the brake.

Likewise, if the platform 34 is traveling upwardly and approaches the position shown in the upper dotted lines in Figure 2, the motor 19 is automatically de-energized in the same manner except that stop 61 moves to the right as viewed in Figure 5 and abuts against pulley 45, thus eventually tensioning spring 63 sufficiently to lower foot lever 48 and stop motor 19. When the platform is to be started downwardly, it is again necessary to manually raise foot lever 48 to close switch 46 and release the brake, and also switch lever 55 is moved to the "down" position.

*Description of Figures 6 and 7*

Referring now to Figures 6 and 7 for a description of another embodiment of the invention, it will be noted that the same numerals have been applied to like parts in these figures as in Figures 1 to 5. In this embodiment of the invention, a different construction is provided for raising and lowering the platform 34. As shown in Figure 6, the motor 19, which is reversible by a main switch similar to switch 54, rotates a shaft 81 through suitable gearing shown diagrammatically at 82. The shaft is provided with bearings 83 supported on angle members 25 and is provided with threads 84 at its outer end. A nut 85 is threaded on the threads 84 and is provided with a flange 86, in which two holes 87 are provided. A single cable 88 may be utilized in this construction and is dead-ended on both slides 37, after passing over pulleys 32, in the same manner as the cables 39 and 41 in the first embodiment of the invention. The cable 88 from the left-hand side, as viewed in Figure 6, passes over a pulley 89 adjacent the bottom of the tank 11, is then looped through holes 87 in nut 85, passes over a pulley wheel 91 adjacent pulley 89, is led along the bottom of tank 11 to a lower pulley 92, and then is dead-ended on right-hand slide 37, as heretofore explained.

The flange 86 is also provided with a slot 93 which engages a stationary guide 94 bolted to an angle support 25, thus preventing the nut 85 from rotating.

*Operation of Figures 6 and 7*

When motor 19 is energized for rotation in one direction, nut 85 is screwed further onto the shaft 81 and cable 88 is, therefore, pulled in and platform 34 is raised. When the motor 19 is energized for rotation in the opposite direction, the nut 85 tends to unscrew and pay out cable, thus permitting platform 34 to lower, due to its own weight and the weight of a radiator which may be placed thereon.

It is obvious that a suitable limit control may be utilized with this embodiment of the invention to prevent the platform from raising or lowering too great a distance.

Figure 8:
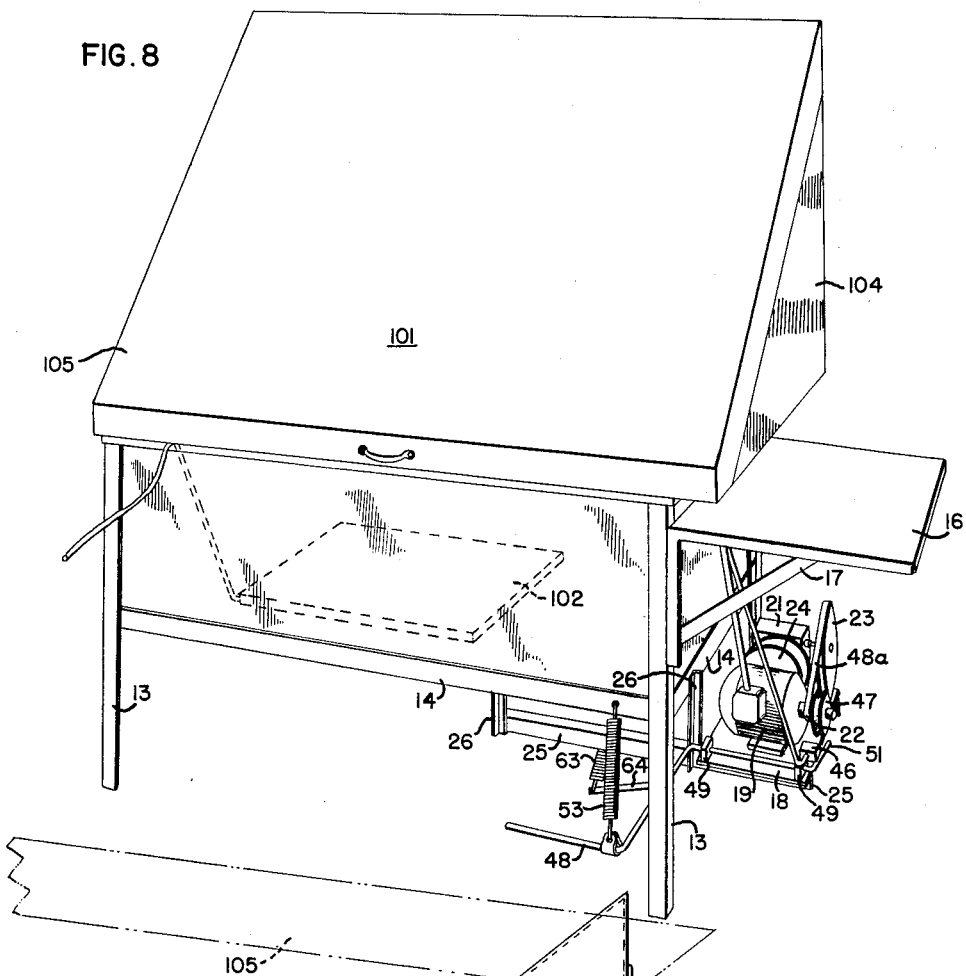
Figure 8 is a perspective view showing another embodiment of the invention adapted for boiling out clogged radiators.
Figure 9:
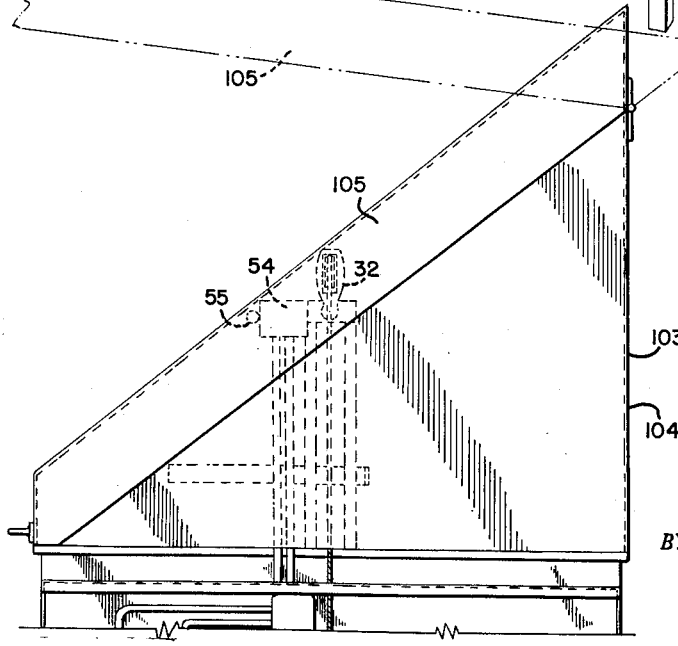
Figure 9 is a partial side elevational view of the apparatus shown in Figure 8, with the cover shown in the open position by the dot and dash lines.

*Description and operation of Figures 8 and 9*

Like numerals have again been used where practical, and the only difference in the construction shown in Figures 8 and 9 over the showing in Figures 1 to 5 is that the cabinet has been provided with a cover generally indicated at 101 and an electrical heater 102 is inserted in the tank. Thus the tank may be utilized for boiling out radiators with a caustic solution for cleaning, and the fumes and steam are prevented from escaping by cover 101.

The cover 101 is formed by providing a fixed vertical back plate 103 on top of tank 11, and fixed triangular side plates 104 on the top of the tank 11. A lid 105 is hinged at the top of back plate 103, which cooperates with fixed back plate 103 and side plates 104 to close tank 11. The dotted lines in Figure 9 show the cover in raised position, and a chain or pulley arrangement may be provided for holding it up, if desired.

By virtue of these arrangements, the repair man at no time needs to have his hands or arms immersed in water, and the work of handling radiators for immersion and removal therefrom to a work bench, is totally eliminated, resulting in saving of a considerable amount of the workman's time. The arrangement further permits better observation of the radiator to determine the locale of the leak, by virtue of the fact that the platform can be supported at any desired position within the height of the liquid in the tank, such as, for example, at a position so that the radiator cores are very close to the upper surface of the liquid level.

Some changes may be made in the construction and arrangement of the parts of our test and repair bench for heat exchangers without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. A platform raising and lowering device for use with a radiator test and repair bench comprising an open-topped tank adapted to contain liquid therein, said device comprising guiding members for said platform, a pair of members cooperating with said fixed guiding members secured to said platform so that the platform moves in a fixed path, means for raising and lowering said platform, said last means including a reversible electric motor, self-locking gearing, control means for reversing the rotation of and for de-energizing said motor, said control means comprising two electrical switches, means included in one of said switches for reversing said motor and for independently de-energizing the same, and means included in the second switch for independently de-energizing the motor and being normally in position to energize said motor, said second switch being effective to energize the motor only when the first switch is in a position to energize the motor.

2. A platform raising and lowering device for use with a radiator test and repair bench comprising an open topped tank adapted to contain liquid therein, said device comprising guiding members for said platform, a pair of members cooperating with said fixed guiding members secured to said platform so that the platform moves in a fixed path, means for raising and lowering said platform, said last means including a reversible electric motor, self-locking gearing, control means for reversing the rotation of and for de-energizing said motor, said control means comprising two electrical switches, means included in one of said switches for reversing said motor and for independently de-energizing the same, means included in the second switch for independently de-energizing the motor and being normally in position to energize said motor, said second being effective to energize the motor only when the first switch is in a position to energize the motor, and manually operated means for each of said switches.

3. A platform raising and lowering device for use with a radiator test and repair bench comprising an open topped tank adapted to contain liquid therein, said device comprising guiding members for said platform, a pair of members cooperating with said fixed guiding members secured to said platform so that the platform moves in a fixed path, means for raising and lowering said platform, said last means including a reversible electric motor, self-locking gearing, control means for reversing the rotation of and for de-energizing said motor, said control means comprising two electrical switches, means included in one of said switches for reversing said motor and for independently de-energizing the same, means included in the second switch for independently de-energizing the motor and being normally in position to energize said motor, said second switch being effective to energize the motor only when the first switch is in a position to energize the motor, and manually operated means for each of said switches, said manually operated means for said second switch being also effective to brake said motor when said means is moved to the position to de-energize said motor.

4. A platform raising and lowering device for use with a radiator test and repair bench comprising an open topped tank adapted to contain liquid therein, said device comprising guiding members for said platform, a pair of members cooperating with said fixed guiding members secured to said platform so that the platform moves in a fixed path, means for raising and lowering said platform, said last means including a reversible electric motor, self-locking gearing, control means for reversing the rotation of and for de-energizing said motor, said control means comprising two electrical switches, means included in one of said switches for reversing said motor and for independently de-energizing the same, means included in the second switch for independently de-energizing the motor and being normally in position to energize said motor, said second switch being effective to energize the motor only when the first switch is in a position to energize the motor, manually operated means for each of said switches, said manually operated means for said second switch being also effective to brake said motor when said means is moved to a position to energize said motor, and automatic limit means for operating said second switch to de-energize said motor upon predetermined upward or downward movement of said platform.

5. A platform raising and lowering device for use with a radiator test and repair bench comprising an open topped tank adapted to contain liquid therein, said device comprising guiding members for said platform, a pair of members cooperating with said fixed guiding members secured to said platform so that the platform moves in a fixed path, means for raising and lowering said platform, said last means including a reversible electric motor, self-locking gearing, control means for reversing the rotation of and for de-energizing said motor, said control means comprising two electrical switches, means included in one of said switches for reversing said motor and for independently de-energizing the same, means included in the second switch for independently de-energizing the motor and being normally in position to energize said motor, said second switch being effective to energize the motor only when the first switch is in a position to energize the motor, manually operated means for each of said switches, said manually operated means for said second switch being also effective to brake said motor when said means is moved to a position to energize said motor, and automatic limit means for operating said second switch to de-energize said motor upon predetermined upward or downward movement of said platform, said automatic limit means also being effective to operate said manually operated means for said second switch.

DANIEL LANGFELD.
ROBERT LECKEY.
RAYMOND A. OLSON.
EARL GRANT WEBB.

REFERENCES CITED

The following references are of record in the file of this patent:

UNITED STATES PATENTS

| Number | Name | Date |
|---|---|---|
| 667,430 | Dubinski | Feb. 5, 1901 |
| 1,049,541 | Shepard et al. | Jan. 7, 1913 |
| 1,253,832 | Jira | Jan. 15, 1918 |
| 1,432,725 | Nolting | Oct. 17, 1922 |
| 1,502,553 | Dozier | July 22, 1924 |
| 1,884,641 | Fitch | Oct. 25, 1932 |
| 1,923,034 | Henricksen | Aug. 15, 1933 |
| 1,990,363 | Baldwin | Feb. 5, 1935 |
| 2,159,063 | Walker | May 23, 1939 |